United States Patent [19]

Geuze et al.

[11] Patent Number: 5,122,591
[45] Date of Patent: Jun. 16, 1992

[54] POLYMERIZATION OF CO/OLEFIN WITH INCREASED CATALYST COMPOSITION CONCENTRATION DURING POLYMERIZATION START UP

[75] Inventors: Maarten M. Geuze, Amsterdam, Netherlands; James A. Salter, Katy, Tex.; Leonardus Petrus; Philip J. M. M. De Smedt, both of Amsterdam, Netherlands

[73] Assignee: Shell Oil Company, Houston, Tex.

[21] Appl. No.: 668,848

[22] Filed: Mar. 13, 1991

[30] Foreign Application Priority Data

Mar. 22, 1990 [NL] Netherlands ............... 9000677

[51] Int. Cl.$^5$ ............................................. C08C 67/02
[52] U.S. Cl. ........................................ 528/392; 526/71
[58] Field of Search ............................. 528/392; 526/71

[56] References Cited

U.S. PATENT DOCUMENTS

| | | | |
|---|---|---|---|
| 3,694,412 | 9/1972 | Nozaki | 260/63 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |
| 4,914,183 | 4/1990 | Geuze et al. | 528/392 |

FOREIGN PATENT DOCUMENTS

| | | |
|---|---|---|
| 121965 | 10/1984 | European Pat. Off. . |
| 213671 | 3/1986 | European Pat. Off. . |
| 181014 | 5/1986 | European Pat. Off. . |
| 257663 | 3/1988 | European Pat. Off. . |

*Primary Examiner*—Harold D. Anderson

[57] ABSTRACT

In an improved continuous process for the production of linear alternating polymers of carbon monoxide and at least one ethylenically unsaturated hydrocarbon by contacting the carbon monoxide and hydrocarbon under polymerization conditions in the presence of a reaction diluent and a catalytic quantity of a catalyst composition formed from a compound of palladium, the anion of a strong non-hydrohalogenic acid and a bidentate ligand of phosphorus, an improved start-up procedure is employed in which the catalyst composition concentration in the reaction diluent is increased until steady state polymerization is reached.

11 Claims, No Drawings

POLYMERIZATION OF CO/OLEFIN WITH INCREASED CATALYST COMPOSITION CONCENTRATION DURING POLYMERIZATION START UP

FIELD OF THE INVENTION

This invention relates to an improved process for the production of linear alternating polymers of carbon monoxide and at least one ethylenically unsaturated hydrocarbon. More particularly, the invention relates to an improved continuous process for the production of such polymers in which a particular initiation or start-up procedure is used.

BACKGROUND OF THE INVENTION

The class of linear alternating polymers of carbon monoxide and at least one ethylenically unsaturated hydrocarbon has been known for some time. Nozaki, U.S. Pat. No. 3,694,412, produced such polymers in the presence of arylphosphine complexes of palladium moieties and certain inert solvents. More recent methods for the production of such polymers, now known as polyketones or polyketone polymers, are illustrated by a number of published European Patent Applications including Nos. 121,965, 181,014, 213,671 and 257,663. These processes involve the use of a catalyst composition employed in a reaction diluent. The catalyst composition typically comprises a compound of palladium, cobalt or nickel, the anion of a strong non-hydrohalogenic acid and a bidentate ligand of phosphorus, arsenic, antimony or nitrogen.

The polymerization process is usefully conducted by a variety of procedures. In a batchwise process, the reactants, catalyst composition and the reaction diluent are charged to a suitable reactor. As the polymerization proceeds, the pressure decreases, the concentration of polymer suspended in the reaction diluent increases and the viscosity of the product mixture increases until further polymerization would pose a significant problem of heat removal. At or before this point the polymerization is terminated. In this modification of the process, only the reaction temperature has remained constant. In a variation of the process, polymerization is conducted through continuous provision of additional reactants so that the pressure as well as the temperature remains constant.

Better results are often obtained through the use of a continuous process in which the reactant monomers, the reaction diluent and the catalyst composition are continuously added to the reactor and polymer suspension is continuously withdrawn from the reactor. In this procedure the reaction pressure and temperature as well as the liquid volume within the reactor remain constant. After an "initiation" or "start-up" period in which the polymer suspension increases, the reaction reaches a steady state in which the polymer suspension removed from the reactor is of a substantially constant composition and the polymer product has substantially constant properties.

In such a continuous polymerization process, one important property of the polymeric product is bulk density. In general, the higher the bulk density of the polymer product, the greater the amount of polymer that can be produced in a reactor of given volume. In addition, the volume of liquid required for washing or purifying the polymer will be lower per unit weight of polymer when polymers of relatively high bulk density are produced. It is also desirable to conduct the polymerization so that a high polymer suspension concentration will be obtained in order to minimize the volume of liquid processed during the polymerization.

The polymer suspension concentration and the bulk density of the polymer product are to some degree influenced by any initiation or start-up procedure employed in the polymerization process. If this start-up procedure can be controlled, desirable polymer suspension concentrations and polymer bulk densities are obtained when the polymerization has reached a steady state. It would therefore be of advantage to provide an improved start-up procedure for polymerization of carbon monoxide and at least one ethylenically unsaturated hydrocarbon to produce linear alternating polymers.

SUMMARY OF THE INVENTION

The present invention provides an improved method for the polymerization of carbon monoxide and at least one ethylenically unsaturated hydrocarbon to produce linear alternating polymer. More particularly, the invention provides an improved start-up procedure for such polymerization as conducted in continuous manner wherein the concentration of the catalyst composition in the reaction diluent increases during the initiation or start-up of the polymerization process.

DESCRIPTION OF THE INVENTION

The present invention provides an improved start-up procedure for the production of linear alternating polymers of carbon monoxide and at least one ethylenically unsaturated hydrocarbon. The ethylenically unsaturated hydrocarbons useful as precursors of the polyketone polymers have up to 20 carbon atoms inclusive, preferably up to 10 carbon atoms inclusive, and are aliphatic including ethylene and other α-olefins such as propylene, butylene, isobutylene, 1-hexene, 1-octene and 1-dodecene or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred linear alternating polymers are copolymers of carbon monoxide and ethylene or are terpolymers of carbon monoxide, ethylene and a second ethylenically unsaturated hydrocarbon of at least 3 carbon atoms, particularly an α-olefin such as propylene.

When the preferred terpolymers are produced by the process of the invention there will be at least about two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polyketone polymers is therefore represented by the repeating formula

$$+CO+CH_2-CH_2\overline{)}_x+CO+G\overline{)}_y \qquad (I)$$

wherein G is the moiety of a second ethylenically unsaturated hydrocarbon of at least 3 carbon atoms polymerized through the ethylenic unsaturation thereof and the ratio of y:x is no more than about 0.5. When the preferred copolymers are produced there will be no second hydrocarbon present and the copolymers are represented by the above formula I wherein y is zero. When y is other than zero, i.e., terpolymers are produced, the —CO—(—CH$_2$CH$_2$—)— units and the —CO—(—G—)— units are found randomly throughout the polymer chain and the ratio of y:x is preferably from about 0.01 to about 0.1. The end groups or "caps" of the polymers will depend upon what materials are present during the polymerization and how and whether the polymers have been purified. The end groups are of little significance so far as the overall properties of the polymer are concerned so that the polymers are fairly represented by the formula for the polymeric chain as depicted above.

Of particular interest are the linear alternating polymers having a number average molecular weight from about 1000 to about 200,000, particularly those polymers having a number average molecular weight of from about 20,000 to about 90,000, as determined by gel permeation chromatography. The properties of the polymers will depend in part upon the molecular weight, whether the polymer is a copolymer or a terpolymer and, in the case of terpolymers, the nature of and the proportion of the second hydrocarbon present. Typical melting points for such polymers will be from about 175° C. to about 300° C., particularly from about 210° C. to about 270° C. Such polymers will have a limiting viscosity number (LVN), as measured in a standard capillary viscosity measuring device in m-cresol at 60° C., of from about 0.4 dl/g to about 10 dl/g, preferably from about 0.8 dl/g to about 4 dl/g.

The polyketone polymers are produced by the general teachings of the above published European Patent Applications. Although the scope of the polymerization process is extensive, a preferred catalyst composition is produced from a compound of palladium, the anion of a non-hydrohalogenic acid having a pH below about 6 and a bidentate ligand of phosphorus. Preferred compounds of palladium are palladium carboxylates including palladium acetate, palladium propionate, palladium butyrate and palladium hexanoate. Particularly preferred is palladium acetate. The acid whose anion is a precursor of the catalyst composition is preferably a non-hydrohalogenic acid having a pKa below 2. Such acids are illustrated by inorganic acids such as sulfuric acid or perchloric acid and organic acids including carboxylic acids such as trichloroacetic acid, dichloroacetic acid and difluoroacetic acid as well as sulfonic acids such as p-toluenesulfonic acid and methanesulfonic acid. Particularly preferred are the anions of trifluoroacetic acid and p-toluenesulfonic acid, especially the anion of trifluoroacetic acid. The anion is preferably provided as the free acid but alternatively is provided in the form of a metal salt, particularly a non-noble transition metal salt. In whatever form, the anion is provided in a quantity of from about 1 mole to about 100 moles per mole of palladium compound. Preferably the anion is provided in a quantity of from about 2 moles to about 50 moles per mole of palladium compound.

The bidentate ligand of phosphorous which is employed as a precursor of the catalyst composition is represented by the formula

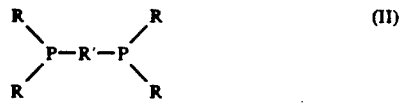
(II)

wherein R independently is aliphatic or aromatic of up to 10 carbon atoms inclusive. R is hydrocarbyl containing only atoms of carbon and hydrogen or is substituted hydrocarbyl containing additional atoms in the form of carbon atom substituents. Illustrative of aliphatic R groups are ethyl, propyl, hexyl, decyl, 2-chloro, 3-propyl or 3-chloro-2-methylbutyl. Illustrative hydrocarbon aromatic R groups include phenyl, naphthyl, tolyl and xylyl. Preferred R groups, however, are substituted aromatic substituents, particularly those aromatic R groups having a polar substituent, especially an alkoxy substituent, on at least one aromatic ring carbon atom which is ortho to the ring carbon atom through which the substituent is connected to the phosphorus. Such groups include 2-methoxyphenyl, 2-ethoxyphenyl, 2,4-dimethoxyphenyl and 2,4,6-tripropoxyphenyl. Especially preferred as the R group is 2-methoxyphenyl. The R' group is a divalent linking group of up to 10 carbon atoms inclusive with from 2 to 4 carbon atoms in the bridge. Illustrative of suitable R' groups are 1,2-ethylene, 1,3-propylene, 1,2-propylene, 2,2-dimethyl-1,3-propylene and 1,4-butylene. The preferred R' group is 1,3-propylene and the preferred bidentate phosphorus ligand is 1,3-bis[di(2-methoxyphenyl)phosphino]propane. The quantity of bidentate phosphorus ligand is suitably from about 0.5 mole to about 2 moles of the bidentate ligand per mole of palladium. Quantities of bidentate phosphorus ligand from about 0.75 mole to about 1.5 mole per mole of palladium are preferred.

In the process of the invention, the hydrocarbon and carbon monoxide reactants are contacted with a catalytic quantity of the catalyst in the presence of the reaction diluent under polymerization conditions. The molar ratio of carbon monoxide to total ethylenically unsaturated hydrocarbon is from about 10:1 to about 1:10 although molar ratios from about 5:1 to about 1:5 are more commonly employed. When operating at steady state, the catalyst composition is present in an amount sufficient to provide from about $1 \times 10^{-7}$ mole to about $1 \times 10^{-3}$ mole of palladium per mole of total ethylenically unsaturated hydrocarbon quantities of catalyst composition sufficient to provide from about $1 \times 10^{-6}$ mole to about $1 \times 10^{-4}$ mole of palladium per mole of ethylenically unsaturated hydrocarbon are preferred. The reaction diluent is a lower alkanol such as acetone or methyl ethyl ketone. Methanol is a preferred reaction diluent.

Typical polymerization conditions include a reaction temperature of from about 25° C. to about 150° C. with reaction temperatures from about 30° C. to about 130° C. being more common. The reaction pressure is from about 5 bar to about 100 bar are preferred.

The process of the invention is a continuous process in which reactants, diluent and the catalyst composition are fed to a suitable reactor maintained at reaction temperature. As polymerization proceeds, the polymer product is formed as a suspension in the reaction diluent whose concentration can be measured. After a suitable reactor time, the polymer product is continuously withdrawn from the reactor as additional polymer is formed and the pressure within the reactor is maintained substantially constant by release of unreacted carbon monoxide or ethylenically unsaturated hydrocarbon.

The process is characterized by an initiation or startup period as the polymer suspension concentration increases and a steady state period during which the polymer suspension concentration remains substantially constant. As the polymerization proceeds at steady state, the bulk density and other properties of the polymer remain substantially constant. It is the advantage of the present process which incorporates an improved start-up procedure that the polymer suspension concentration and the bulk density of the polymer product are relatively high at steady state. The process of the invention, at steady state, is characterized by a polymer suspension concentration of at least 12.5% by weight and a polymer bulk density in excess of 100 kg/m$^3$. These values are achieved during a reactor residence time of from about 2 hours to about 30 hours.

The improved start-up procedure employed in the process of the invention is one in which the concentration of the catalyst composition in the reaction diluent increases until steady state polymerization is obtained. In one embodiment of the start-up procedure, an initial catalyst composition addition rate is selected at from about 15% to about 25% of the catalyst composition addition rate at steady state operation. As the start-up proceeds, the catalyst composition addition rate is increased in increments of about 15% to about 35% of the catalyst composition rate at steady state polymerization and the rate of diluent addition is held relatively constant. The time of incremental increase in catalyst composition rate corresponds to from about 1 to 3 times the residence time of the polymer in the reactor. In a second, although generally less preferred embodiment of the start-up procedure, an amount of reaction diluent in excess of that required for stead state polymerization, e.g., up to about twice that amount required for steady state polymerization, is initially provided and as the start up proceeds the rate of diluent addition is decreased to that required for steady state polymerization over a time interval of from about 1 to about 3 times the reactor residence time as the rate of catalyst composition addition remains relatively constant. By either embodiment, an increasing catalyst composition concentration in the reaction diluent is utilized until steady state polymerization is achieved in which state the polymer suspension concentration and the polymer bulk density remain substantially constant. As previously stated, the improved start-up procedure results in relatively high polymer suspension concentration and polymer bulk density when steady state polymerization is reached.

The linear alternating polymers produced by the process of the invention are thermoplastic polymers of relatively high molecular weight which have established utility as premium thermoplastics. The polymers are processed by techniques conventional for thermoplastics such as extrusion, injection molding and thermoforming into shaped articles. Specific applications include the production of containers for food and drink and parts and housings for automotive applications.

The invention is further illustrated by the following comparative examples (not of the invention) and the illustrative embodiments which should not be regarded as limiting.

COMPARATIVE EXAMPLE I

A linear alternating polymer of carbon monoxide and ethylene was produced in a stirred reactor which initially contained 66.5 kg of methanol and a 30:70 percent by mole mixture of carbon monoxide and ethylene. The temperature was maintained at 83° C. and the pressure was maintained during polymerization at 45 bar by the continuous addition of additional 30:70 percent mixture. At the start of reaction, termed run-hour zero, methanol addition commenced at the rate of 3.5 kg/hr, a solution (Solution 1) of 1000 mg palladium acetate, 2941 mg 1,3-bis[di(2-methoxyphenyl)phosphino]propane and 1067 mg trifluoroacetic acid per liter of acetone was introduced at a rate of 2:1 ml/hr and a solution (Solution 2) of 3000 mg trifluoroacetic acid was introduced at the rate of 1.4 ml/hr.

At run-hour 40 the polymer content of the polymer suspension removed from the reactor was 4% by weight and the bulk density of the product copolymer was 70 kg/m$^3$. At run-hour 50 and also at run-hour 70 the same values were found for the polymer suspension concentration and the copolymer bulk density.

COMPARATIVE EXAMPLE II

A linear alternating copolymer of carbon monoxide and ethylene was produced by a procedure substantially similar to that of Comparative Example I, except that the rate of addition of Solution 1 was 11 ml/hr and the rate of addition of Solution 2 was 7.5 ml/hr.

At run-hour 18, the polymer content of the suspension recovered from the reactor was 8% by weight and the bulk density of the copolymer product was less than 50 kg/m$^3$. Due to the very high viscosity of the suspension, stirring was no longer possible and the example was terminated.

ILLUSTRATIVE EMBODIMENT I

A linear alternating terpolymer of carbon monoxide, ethylene and propylene was produced in a stirred reactor which initially contained 61 kg of methanol and a 25:55:25 mixture by mole percent of carbon monoxide, ethylene and propylene. The temperature was 78° C. and the pressure was maintained at 45 bar by the continuous addition of the gas mixture. At run-hour zero the rate of methanol addition was set at 5 kg/hr, the rate of Solution 1 addition was set at 6.33 ml/hr and the rate of addition of Solution 2 was set at 4.18 ml/hr.

At run-hour 48 the polymer content of the suspension removed from the reactor was 4.8% by weight and the bulk density of the terpolymer product was 80 kg/m$^3$. At run-hour 52 the feed rates for introduction of Solution 1 and Solution 2 were changed to 12.66 ml/hr and 8.36 ml/hr, respectively.

At run-hour 92 the suspension concentration was 8.7% by weight and the bulk density of the terpolymer was 120 kg/m$^3$. At run-hour 96 the rates of addition of Solution 1 and Solution 2 were changed to 19 ml/hr and 12.54 ml/hr, respectively.

At run-hour 137 the suspension concentration was 12.3% by weight and the bulk density of the terpolymer was 160 kg/m$^3$. At run-hour 143 the rates of addition of Solution 1 and Solution 2 were changed to 25.32 ml/hr and 12.72 ml/hr, respectively.

At run-hour 188 the suspension concentration was 15% by weight and the bulk density of the terpolymer was 200 kg/m$^3$. At run-hour 192 the feed rates of Solution 1 and Solution 2 were changed to 31.65 ml/hr and 20.9 ml/hr, respectively.

At run-hour 240 the suspension concentration was 17.9% by weight and the bulk density was 260 kg/m$^3$. At run-hour 285 the same values were found for the polymer suspension concentration and the bulk density.

ILLUSTRATIVE EMBODIMENT I

A linear alternating terpolymer of carbon monoxide, ethylene and propylene was produced in a stirred reactor which initially contained 60 kg of methanol and a 30:45:25 mixture by percent mole of carbon monoxide, ethylene and propylene. The reaction temperature was 80° C. and the pressure was maintained at 45 bar by the continuous addition of the gas mixture during polymerization.

At run-hour zero, methanol was introduced at 5 kg/hr, Solution 1 at the rate of 59 ml/hr and Solution 2 at the rate of 40 ml/hr.

At run-hour 90 the polymer composition of the suspension removed from the reactor was 6% by weight and the bulk density of the terpolymer was 100 kg/m$^3$. At run-hour 94 the feed rate of methanol was changed to 8.7 kg/hr.

At run-hour 138 the suspension concentration was 9% by weight and the bulk density of the terpolymer was 150 kg/m$^3$. At run-hour 142 the feed rate of the methanol was reduced to 6.7 kg/hr.

At run-hour 200 the suspension concentration was 14% by weight and the bulk density of the terpolymer was 200 kg/m$^3$. At run-hour 240 the same values were found for the suspension concentration and the bulk density.

What is claimed is:

1. In the process for the continuous production of a linear alternating polymer of carbon monoxide and at least one ethylenically unsaturated hydrocarbon by contacting in a reactor the carbon monoxide and hydrocarbon under polymerization conditions in the presence of a reaction diluent and a catalytic quantity of a catalyst composition formed from a compound of palladium, an anion of a strong non-hydrohalogenic acid and a bidentate ligand of phosphorus, the improvement comprising increasing catalyst composition concentration in the reaction diluent during start-up of polymerization until steady state polymerization is achieved.

2. The process of claim 1 in which the increase in catalyst composition concentration is achieved through an increase in catalyst composition addition to the reactor.

3. The process of claim 1 wherein the increase in catalyst composition concentration is achieved through a decrease in diluent addition to the reactor.

4. In the process of the continuous production of linear alternating terpolymer of carbon monoxide, ethylene and propylene by charging to a reactor, under polymerization conditions, carbon monoxide, ethylene and propylene, a methanol reaction diluent and a catalyst composition formed from palladium acetate, the anion of a non-hydrohalogenic acid having a pKa below 2 and a bidentate ligand of phosphorus, and withdrawing from the reactor the linear alternating polymer, the improvement comprising increasing catalyst composition concentration in the reaction diluent during start-up of polymerization until steady state polymerization is achieved.

5. The process of claim 4 in which the increase in catalyst composition concentration results from an increase in an initial rate of catalyst composition addition to the reactor.

6. The process of claim 5 wherein the initial rate of catalyst composition addition is from about 15% to about 25% of the rate of addition of catalyst composition at steady state.

7. The process of claim 6 wherein the initial rate of catalyst composition addition is increased in increments of about 15% to about 35% of the rate of addition of catalyst composition at steady state.

8. In the process of the continuous production of linear alternating copolymer of carbon monoxide and ethylene by charging to a reactor, under polymerization conditions, carbon monoxide and ethylene, a methanol reaction diluent and a catalyst composition formed from palladium acetate, the anion of a non-hydrohalogenic acid having a pKa below 2 and a bidentate ligand of phosphorus, and withdrawing from the reactor the linear alternating polymer, the improvement comprising increasing catalyst composition concentration in the reaction diluent during start-up of polymerization until steady state polymerization is achieved.

9. The process of claim 8 in which the increase in catalyst composition concentration results from an increase in an initial rate of catalyst composition addition to the reactor.

10. The process of claim 9 wherein the initial rate of catalyst composition addition is from about 15% to about 25% of the rate of addition of catalyst composition at steady state.

11. The process of claim 10 wherein the initial rate of catalyst composition addition is increased in increments of about 15% to about 35% of the rate of addition of catalyst composition at steady state.

* * * * *